(12) United States Patent
Blachford

(10) Patent No.: US 8,717,229 B2
(45) Date of Patent: May 6, 2014

(54) ANTENNAS

(75) Inventor: Richard Blachford, Birmingham (GB)

(73) Assignee: TRW Automotive US LLC, Livonia, MI (US)

( * ) Notice: Subject to any disclaimer, the term of this patent is extended or adjusted under 35 U.S.C. 154(b) by 259 days.

(21) Appl. No.: 13/201,045

(22) PCT Filed: Feb. 12, 2010

(86) PCT No.: PCT/IB2010/000277
§ 371 (c)(1),
(2), (4) Date: Dec. 12, 2011

(87) PCT Pub. No.: WO2010/092469
PCT Pub. Date: Aug. 19, 2010

(65) Prior Publication Data
US 2012/0068882 A1    Mar. 22, 2012

(30) Foreign Application Priority Data

Feb. 12, 2009   (GB) ................................ 0902314.4

(51) Int. Cl.
*G01S 13/42*   (2006.01)
*H01Q 3/24*    (2006.01)
*H01Q 3/26*    (2006.01)
*G01S 13/48*   (2006.01)
*G01S 13/44*   (2006.01)
*G01S 7/28*    (2006.01)

(52) U.S. Cl.
CPC ............... *H01Q 3/24* (2013.01); *H01Q 3/2605* (2013.01); *G01S 13/48* (2013.01); *G01S 13/4463* (2013.01); *G01S 7/28* (2013.01)
USPC ........... 342/109; 342/146; 342/157; 342/158; 342/374

(58) Field of Classification Search
CPC ......... H01Q 3/24; H01Q 3/2605; H01Q 3/40; H01Q 25/02; H01Q 3/26; H01Q 3/30; H01Q 3/38; G01S 13/48; G01S 7/28; G01S 13/4463
USPC ........... 342/109, 70, 127, 133, 139, 146, 152, 342/154, 157–158, 194, 368, 371–372, 374
See application file for complete search history.

(56) References Cited

U.S. PATENT DOCUMENTS 4,633,256 A * 12/1986 Chadwick ..................... 342/368
5,220,320 A *  6/1993 Assal et al. ................. 340/2.21

(Continued)

FOREIGN PATENT DOCUMENTS

DE    10163455 A1    8/2003
GB     2396501 A     6/2004

OTHER PUBLICATIONS

Great Britain Search Report for Application No. GB0902314.4 dated May 8, 2009.

*Primary Examiner* — John B Sotomayor
(74) *Attorney, Agent, or Firm* — MacMillan, Sobanski & Todd, LLC

(57) ABSTRACT

An active antenna array is arranged to activate subsets of switchable elements causing the antenna to form a first beam having a first beam pattern, and later to form a second beam having a second beam pattern of substantially identical far field radiation pattern to the first beam pattern but with different origins. A receiver receives radiation reflected from a target back to the antenna when the antenna is configured with the first beam pattern and then when configured with the second beam pattern, and compares the phase of the radiation received at the receiver when the antenna is configured with the first beam pattern with the phase of the radiation received at the receiver when the antenna is configured with the second beam pattern to provide a phase difference signal. A target locating means determines the angular location of the target from the phase difference signal.

15 Claims, 4 Drawing Sheets

(56) References Cited

U.S. PATENT DOCUMENTS

| | | |
|---|---|---|
| 5,465,097 A | 11/1995 | Fry |
| 5,541,607 A * | 7/1996 | Reinhardt ..................... 342/372 |
| 5,734,345 A * | 3/1998 | Chen et al. ..................... 342/74 |
| 5,764,187 A | 6/1998 | Rudish et al. |
| 5,790,071 A * | 8/1998 | Silverstein et al. ........... 342/354 |
| 6,208,294 B1 * | 3/2001 | Kobayakawa et al. ........ 342/373 |
| 6,771,218 B1 * | 8/2004 | Lalezari et al. ................ 342/373 |
| 2012/0068882 A1 * | 3/2012 | Blachford ..................... 342/104 |

* cited by examiner

ANTENNAS

CROSS-REFERENCE TO RELATED APPLICATIONS

This application is a national stage of International Application No. PCT/IB2010/000277 filed Feb. 12, 2010, which claimed priority to Great Britain Patent Application No. 0902314.4 filed Feb. 12, 2009, the disclosures of which are incorporated herein by reference.

BACKGROUND OF THE INVENTION

This invention relates to improvements in antenna arrays, such as active slot antennas and the like, which can be configured to produce a set of directional far field radiation patterns suitable for use in determining the angular location of a target.

The use of radar to determine the distance to a target is well known. In a very simple system the time of flight of a signal transmitted from an antenna to a target and returning to the antenna provides an indication of the range of the target. This works well for targets that are very far away, but for close targets the time of flight may be too short to be analysed. In the case of automotive applications, for instance, the distance to a target is typically of the order of only a few hundred meters or less, making measurements based on time of flight impractical. In such applications alternative modulation schemes which monitor the phase of signals can be used. Examples of such schemes, which fall within the scope of the present invention, include frequency shift key modulation (FSK) radar, FMCW and LFMSK radar.

Steerable antennas which can produce directional far field radiation patterns to give directional sensitivity are also well known. FIG. 1 illustrates a typical non-directional beam pattern in which the far field strength at all angles is equal, illustrated in the form of a graphical representation of the amplitude (in decibels) of radiation from an antenna as a function of angle, and FIG. 1(b) shows a corresponding directional beam pattern sometimes referred to as a pencil beam. As can be seen the directional pattern is characterised by a power peak or main lobe 1 which extends in a defined direction and which subtends an angle θ to an axis of the antenna and is centred on an origin O. As shown the origin is located at the centre of the antenna. Within this application, the term beam pattern is used to describe both the shape of a far field pattern, encompassing the direction of the main lobe relative to an axis defined with respect to the antenna, as generated by an antenna in respect of transmit and or receive of radiation, and also the origin of the main lobe or power peak of the far field radiation along that axis.

A directional beam pattern such as the pencil beam of FIG. 1b can be achieved in many ways but one known antenna configuration, shown in FIG. 2, is called a phased array and employs an array of antenna elements Φ, each one connected to a source or detector 21 of radiation by a different phase offset, achieved by using different path lengths L from the source or detector 21 to each element Φ. In a simple phased array the elements each have a fixed phase delay and are permanently on. This provides a beam which has a fixed beam pattern. Generally the length of the array is defined in terms of the number of elements. The elements can take many forms.

In a refinement it is known to associate each element with an "on-off" switch, or other gain control device, which enables the element to be made active or inactive in response to drive signals applied to the switches by a processing unit. Each element may be independently switchable, and in this way the array can be modified to produce a variety of different beam patterns. Typically the processing unit will include a memory which stores a variety of switch values "On or Off" that have been derived empirically for a desired beam pattern, hereinafter called a radiation pattern.

There are many examples of such configurable antenna arrays known in the art. Many of these include elements which comprises areas of a conductive waveguide (such as a rod) through which radiation can escape by evanescent coupling. This coupling can be achieved in many ways, such as connecting regions of the waveguide to conducting patches formed on a drum or cylinder. Rotating the drum or cylinder varies the pattern of conducting patches on the rod, thus changing the regions through which radiation escapes. These regions controlled by patches fall within the term element as used in this application. Examples of such arrays are known from U.S. Pat. No. 6,750,827 and U.S. Pat. No. 5,959,589. Another example of such a radar apparatus is known from US 2007/0035433A1 to Waveband Corporation. As an alternative to the use of a rotating drum or cylinder, fixed conductive patches may be provided along the rod which are switched on or off using diodes or such like. Again, this falls within the scope of the term element as used in this application. A further example is known from U.S. Pat. No. 5,982,334 in which a semiconductor slab and plasma grating are used to cause evanescent coupling to occur in discrete regions along the length of a quartz rod, the regions defining antenna elements.

Looking again at FIG. 1b, a target 2 located along a line starting at the origin and lying in the direction θ will cause a strong echo signal to be received. If the target moves off that direction a weak echo is received. By producing a number of different beam patterns, each forming a different far field pattern, with the same origin but different directionality (e.g. a series of pencil beams which may overlap and extend collectively over a wide range of angles) and recording the amplitude of received echoes as the beams are applied one after the other, the beam pattern which produces the strongest echo can readily be identified, and hence the direction to the target can be determined from the directionality of that beam.

To provide a good resolution a large number of beams with highly directional far fields are needed, i.e. a large number of different beam patterns. To achieve this a large array, having a lot of antenna elements, is needed as a complex drive pattern involving many elements is needed. This makes the radar expensive and also bulky as there are constraints on the acceptable spacing between elements. Also, the more directional the beams (e.g. finer the pencil beams) that are used the more beams are needed to sweep across a given range of angles, the entire sweep being a radar "cycle". Since each beam needs to be held in place for a given length of time in order to obtain high quality velocity information, a large number of beams may produce an unacceptably high radar cycle time.

BRIEF SUMMARY OF THE INVENTION

According to a first aspect the invention provides an active antenna array of the kind comprising a plurality of switchable antenna elements controlled by a switching means which is operable to selectively active selected ones of the antenna elements to emit/receive a shaped beam of radiation, and characterised in that:
the apparatus is arranged to provide a first drive signal which causes the switching means to activate a first subset of elements at a first period of time, the first subset of elements causing the antenna to form a first beam having a first beam pattern, and a second drive signal which causes the switching means to activate a second subset of the elements at a second period of time which is different from the first period of time, the second subset of elements causing the antenna to form a second beam having a second beam pattern, the first and second beam patterns comprising substantially identical far field radiation patterns but with different origins which are offset along an axis defined relative to the antenna array by a predetermined amount, and further comprising:

a receiver which receives radiation that has been emitted by the antenna and subsequently reflected from a target back to the antenna when the antenna is configured with the first beam pattern and receives radiation that has been emitted by the antenna and subsequently reflected from a target back to the antenna when the antenna has been configured with the second beam pattern, a comparison means for comparing the phase of the radiation received at the receiver when the antenna is configured with the first beam pattern with the phase of the radiation received at the receiver when the antenna is configured with the second beam pattern to provide a phase difference signal, and target locating means which determines the angular location of the target relative to the antenna by processing the phase difference signal with the known offset between the different origins of the first and second far field radiation patterns.

The invention therefore provides an antenna in which an improved target location is achieved by configuring the antenna with two different beam patterns, each of an identical far field pattern but with offset origins, which will result in slightly different path lengths for reflected signals from a target when configured in each of the configurations. The difference in path length is then used together with knowledge of the offset between the patterns to determine the angular position of the target.

In particular, the invention may be used to achieve the same levels of angular resolution that can be achieved from prior art multi-element arrays from arrays with fewer elements. Alternatively it can be used to enhance the performance of any given multi-element array.

The first and second beam patterns that are formed may in fact be identical apart from the main beams having different origins along the array of elements.

It is appreciated that in the event that the target is moving this will also cause a phase shift between the two echo signals depending on the modulation scheme that is used. To eliminate any error this may produce, the apparatus may be adapted to measure the velocity of the target. Depending on the modulation scheme used, this information can be obtained from the frequency and phase of the transmitted signals to determine the radial velocity of any targets. This radial velocity measurement can then be combined with the time difference between the first and second measurements to determine the distance of the target. This can then be converted into a phase value which indicates the amount of error in the phase difference measurement that has to be removed in order to get the phase difference due purely to the angular position of the target.

The array may comprise a linear array of length X elements, which may be equally spaced. In this case, the defined axis along which the origin of the main lobe is offset may coincide with the major axis of the linear array. Of course, other arrays of different shape may be used within the scope of this invention.

The first drive signal may cause a first subset of the total number of elements forming the array to be switched either on or off in a set pattern which spans a length of Y elements, where Y is less than X. The second drive signal may cause a second, different, subset of the total number of elements to be switched either on or off in the same pattern but offset from the first.

The first and second patterns may be identical lengths X and may therefore simply be moved along the array by 1, or 2 or 3 or more elements due to the offset of the subsets. This will result in the origin of the corresponding first and second beams patterns being offset by the spacing between 1, 2 or 3 or more elements respectively.

The array may, for instance, have a length Y=400 elements, or 200 or more elements. Each element of the array may be spaced centre to centre from an adjacent element by one half of a wavelength of the radiation they are fed and receive, or by less than one half of a wavelength $\lambda$.

Each of the elements of the array may be associated with a different delay by which we mean that the path length from the feeder to each element is different.

Within the total length of Y elements of the array, the first and second drive signals may be chosen such that elements arranged over a length of the array of length that is less than that of the Y elements are used to form the pattern. Of course, within this subset of the Y elements not all of the elements need to be switched ON, i.e. they need not all be active. What we mean is that, in effect, the remainder of the Y elements outside of this subset play no role in the formation of the beam, and there is a pattern of active elements of length Y spanning a subset of the arrays elements.

The beam patterns, and the corresponding far field radiation patterns, of the first and second drive signals may correspond to a directional far field pattern having a main (major) lobe whose origin is located at the centre of the length of Y elements, and whose dominant direction is dependent on the pattern of elements within the length of Y elements which are active. The antenna when configured with such a far field pattern will detect the presence of targets within the major lobe and will report an accurate angle by triangulation of the two offset major lobes from the first and second drive signals. For targets outside the major lobe, only a weak echo will be produced or no echo at all.

Therefore, the apparatus when driven with only a single first drive signal and a single second drive signal having a single major lobe will only be able to detect targets in one small range of angles depending on how narrow the major lobe is, as set by the far field radiation pattern.

To enhance the usefulness of the apparatus, it may be arranged to provide multiple pairs of first and second drive signals, each pair of drive signals causing the antenna to be configured in first and second beams patterns, with the shapes of each pair corresponding to identical, but offset, far field radiation patterns. For example, each beam pattern may define a far field pattern having a single major lobe directed in a predetermined direction, with the major lobe of each pair pointing in a different direction to that of any of the others e.g. a set of directional beams covering a range of angles wider than any one of the major lobes.

The apparatus may drive the elements sequentially with each pair of first and second drive signals of the multiple pairs to sweep a set of major lobes across a range of angles as determined by the different far field patterns.

The apparatus may comprise two feeders, one for coupling radiation from a source to the active elements and another for coupling radiation received at the active elements to a detector such as an in-phase and quadrature (IQ) detector.

Alternatively a single feeder may be used to both transmit and receive radiation.

The apparatus may comprise a mono-static antenna in which a single array of elements is provided which are used both to transmit and receive is provided. In this case, the antenna can be configured with the first and second beam patterns during transmission only, receiving only, or both. In each case, the desired directionality needed to obtain the path length information can be obtained.

The apparatus may comprise an active antenna of the kind disclosed in U.S. Pat. No. 5,982,334 which is herein incorporated by reference in its entirety.

Alternatively, it may comprise a bi-static antenna in which two arrays of elements are provided. The first and second pattern pairs may be applied to just one array to provide the required directionality of field, or to both. This may be the transmit array or the receive array.

According to a second aspect the invention provides a method of controlling an active antenna array so as to determine the angular location of a target, the antenna array comprising a plurality of switchable antenna elements controlled by a switching means which is operable to selectively active selected ones of the antenna elements to emit or receive radiation from or to a source of radiation, the method comprising the steps of:
(i) providing a first drive signal which causes the switching means to activate a first subset of elements at a first period of time, the first subset of elements causing the antenna to form a beam having a first beam pattern,
(ii) providing a second drive signal which causes the switching means to activate a second subset of elements at a second period of time, the second subset of elements causing the antenna to form a beam having a second beam pattern, the first and second beam patterns providing substantially identical far field radiation patterns but with different origins which are offset along an axis defined relative to the antenna array by a predetermined amount, and further comprising:
(iii) receiving radiation that has been emitted by the antenna and subsequently reflected from a target back to the antenna when the antenna is configured with the first beam pattern,
(iv) receiving radiation that has been emitted by the antenna and subsequently reflected from a target back to the antenna when the antenna has been configured with the second beam pattern,
(v) comparing the phase of the radiation corresponding to the antenna being configured with the first beam pattern with the phase of the radiation corresponding to the antenna being configured with the second beam pattern to provide a phase difference signal, and
(vi) determining the angular location of the target relative to the antenna by processing the phase difference signal with the known offset between the different origins of the far field radiation patterns of the first and second beam patterns.

The method may comprise providing first and second drive signals which respectively cause a first subset of the antenna elements and a second, different, subset of the antenna elements to be switched with the same pattern of active and inactive elements, the first subset of switched elements being offset along the array from the second subset of switched elements.

The first and second subsets of elements may have a length, in elements, less than the total length of elements in the array. The first and second subsets may overlap.

The method may comprise repeating steps (i) to (vi) using different pairs of first and second drive signals, each pair of first and second drive signals causing the array to be configure with the same far field pattern within each pair, but differing far field patterns for each of the different pairs. The multiple far field patterns may each provide a different directional sensitivity to the array to enable a sweep across multiple directions to be made.

Each far field pattern may define a main beam with a width of substantially +/−15 degrees or less. The beams of each of the pairs may overlap.

The method may be applied to a mono-static or bistatic steerable antenna array.

Other advantages of this invention will become apparent to those skilled in the art from the following description of the preferred embodiments, when read in light of the accompanying drawings.

DETAILED DESCRIPTION OF THE INVENTION

Figure 1A:
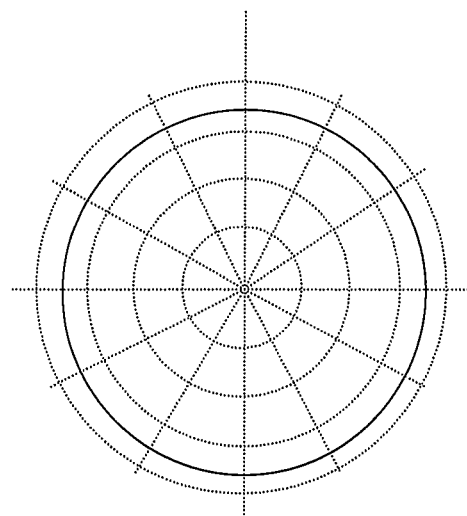
FIG. 1(a) is an illustration of the far field pattern produced from a direction insensitive antenna array.
Figure 1B:
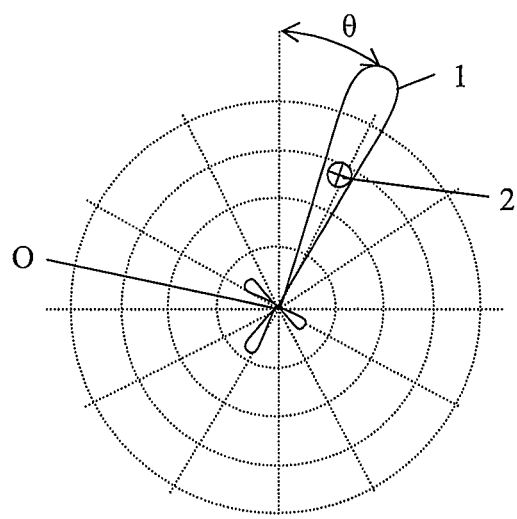
FIG. 1(b) is an illustration similar to that of FIG. 1 for an antenna with a directionally selective far field pattern dominated by a main beam.
Figure 2:
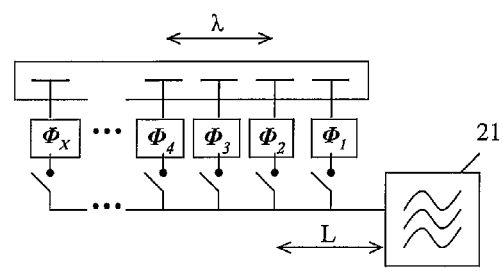
FIG. 2 is a schematic illustration of a phased array antenna which can be used to produce a steerable beam of the kind illustrated in FIG. 1(b) and which can be readily configured to change the shape of the beam.
Figure 3:
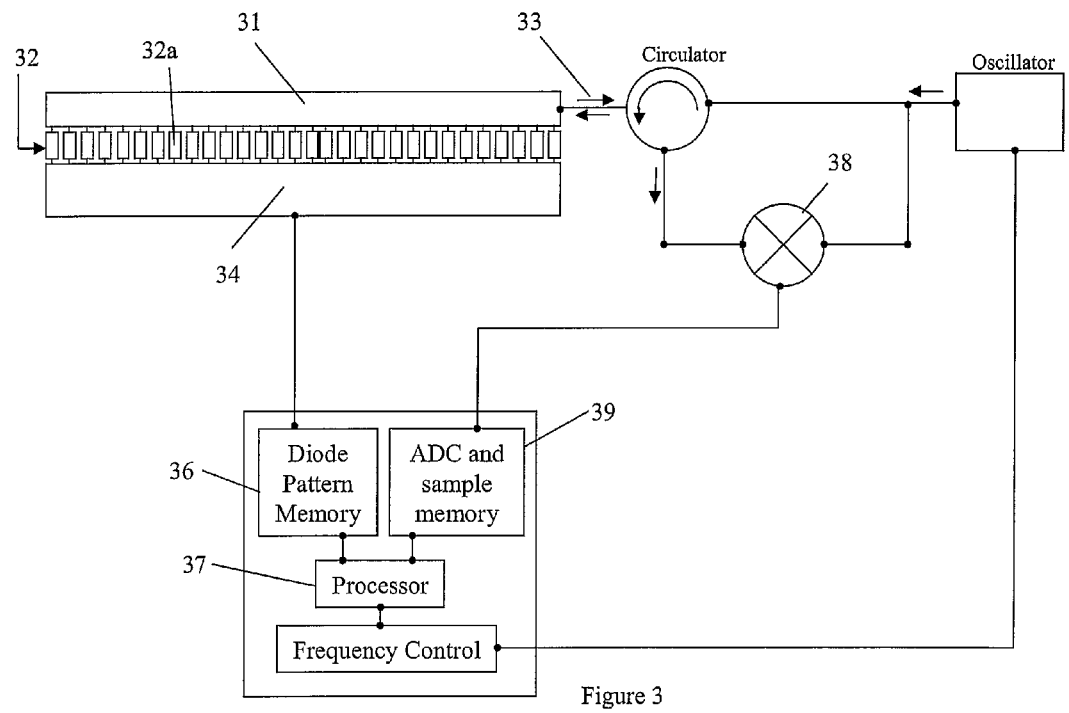
FIG. 3 is an illustration of an embodiment of a mono-static phased array in accordance with the present invention.

Shown in FIG. 3 is a mono-static phased array, at its heart is a rod 31 like element which functions as a waveguide of the kind disclosed in U.S. Pat. No. 5,982,334. Coupled to the rod 31 is a switching means 32 which can be conceptually considered to comprise a set of switches. Each switch can be operated between a high gain "on" state and "off" state. In the on state, the switch causes a region of the rod to permit radiation to escape from the rod 31 by evanescent switching. This region is referred to as an antenna element within this application, and because it can be turned on or off by the switch it can be considered to be an active antenna element. The switching means 32 co-operates with the rod 31 in such a manner that a series of these evanescent coupling regions are defined along the length of the rod 31 to form a configurable linear antenna array.

The switching means 32 comprises a semi-conductive slab with a plasma grating, as taught in U.S. Pat. No. 5,982,334 but could take many other forms. Indeed the precise physical nature of the switching means 32 is to be understood not to be limiting to the scope of this invention.

In use microwave radiation 33 is fed into one end of the cylindrical rod 31, such that the rod functions as a feeder. The switches of the switching means 32 are connected to a drive circuit 34 which provides drive signals that cause the individual switches 32a of the switching means 32 to turn on or off in a defined sequence as determined by a drive signal applied to the drive circuit 34. For instance, a drive signal could cause the switching means 32 to turn all the switches on, in turn causing all the elements of the rod 31 to permit radiation to escape through them by evanescent coupling, whilst a different drive signal could cause the switching means to turn alternate elements on and off. Each drive signal used in this embodiment is chosen empirically to produce a desired beam pattern for radiation from the antenna.

At this point it should be noted that for a mono-static array the drive signals also apply patterns to the switches that turn the elements on and off to permit them to receive radiation by evanescent coupling into the rod 31 as well as transmit radiation. The beam pattern therefore sets the sensitivity of the antenna to radiation from different directions when acting as a receiver.

Figures 4A, 4B:
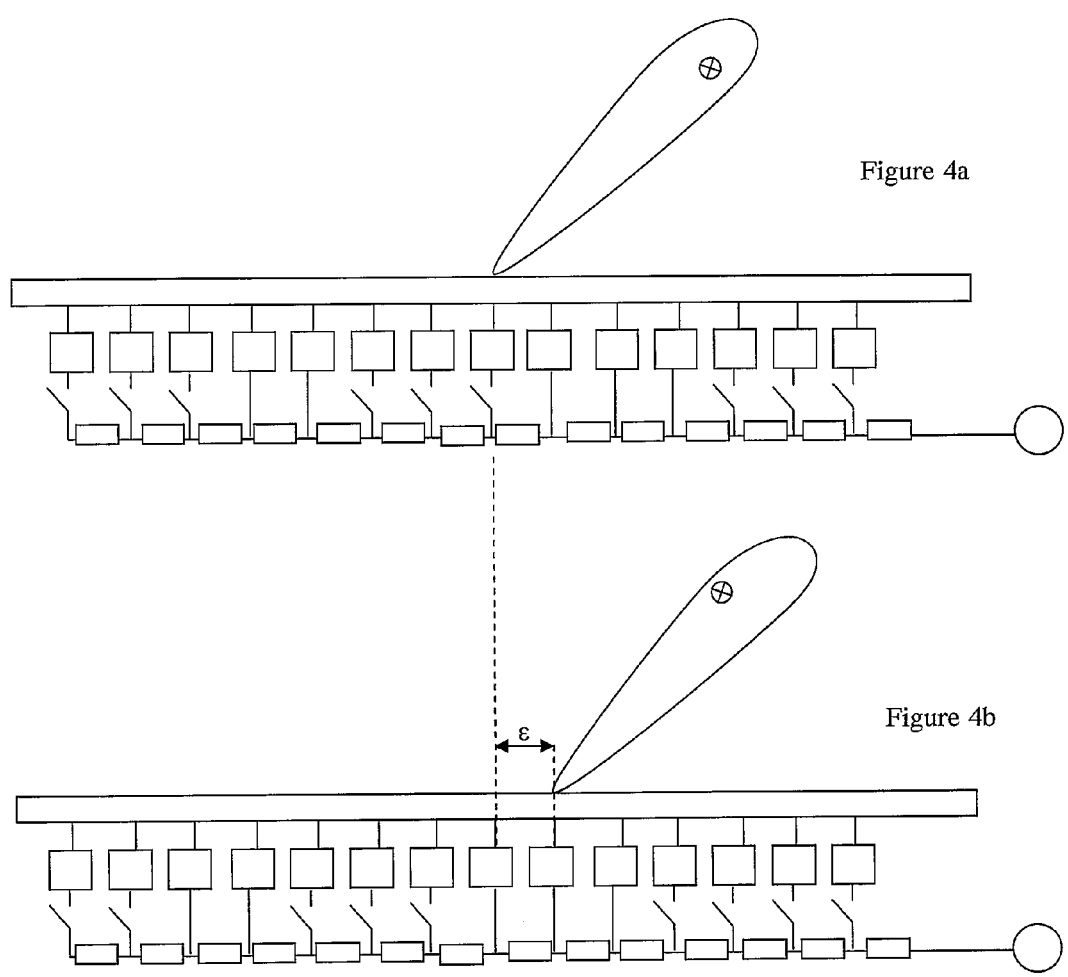
FIG. 4a is an illustration of a first beam pattern produced when a first drive signal is applied to the antenna of FIG. 3.
FIG. 4b is an illustration of a second beam pattern produced when a second drive signal is applied to the antenna of FIG. 3.

In this embodiment, multiple drive signals are provided and they are pre-stored in an area of memory 36 from which they can be accessed by a processor 37 which applies them to the drive circuit 34. Each stored drive signal causes a subset of the total number of elements—in this case spanning a length of the rod equal to at least 100 elements—to be switch on or off in a pattern. The remaining elements outside of the subset are left inactive so they are switched off and play no role in the operation of the antenna. An example of such a drive pattern is shown in FIG. 4(a); although for simplicity a subset of only 14 elements is shown.

Specifically, although not limiting to the invention, the drive signals of the preferred embodiment comprise 8 pairs of drive signals, each pair comprising a first drive signal and a second drive signal controlling first and second subsets of elements with a length of 100 elements and which, when applied to the drive circuit cause the antenna to emit radiation having identical beam patterns. This can be seen in FIG. 4(b) which, as with FIG. 4(a), shows only 14 elements making up a second subset.

Importantly, the first drive signal causes a subset of the elements that spans a different 100 elements to be driven in a pattern, and the second drive signal causes a different subset of 100 elements to be driven in the same pattern but with the origin of the far field patterns offset by 1 element $\epsilon$.

Figure 5:
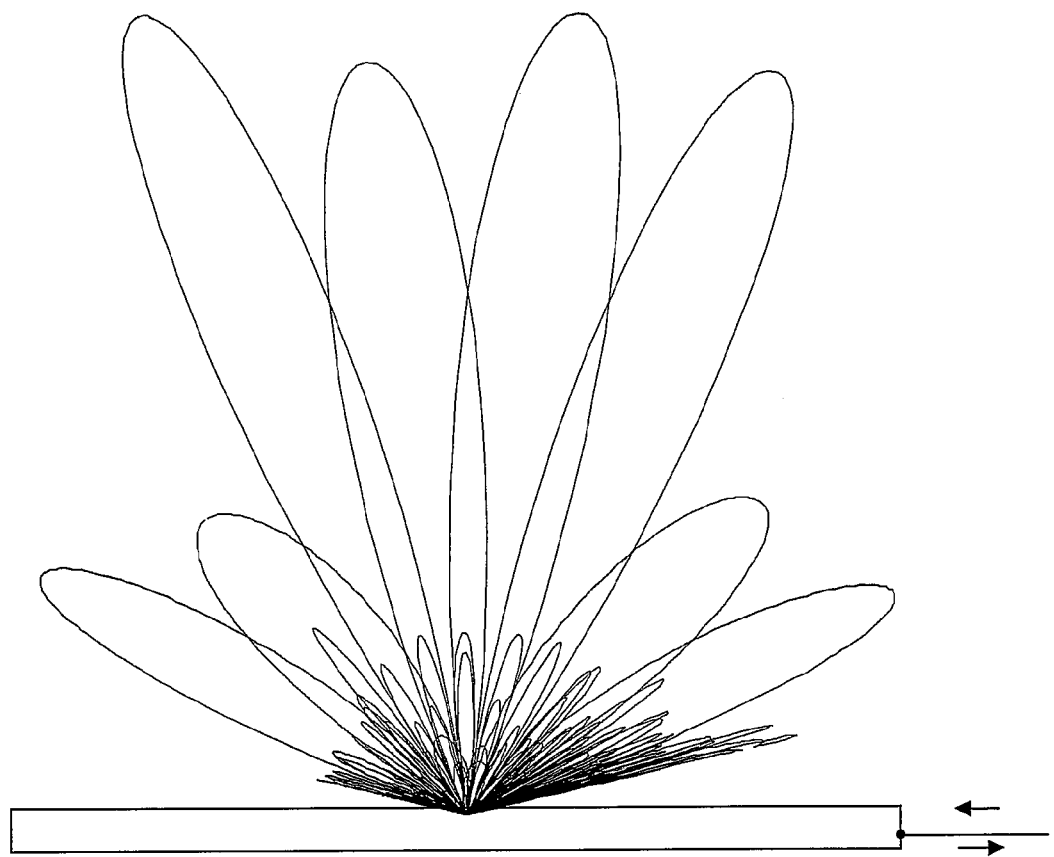
FIG. 5 is a representation of a set of main lobes used to sweep through a range of angles, each lobe corresponding to a respective different first drive signal.

Also, the far field patterns of each of the 8 pairs correspond to different pencil beams as shown in FIG. 5, with main lobes or power peaks covering a range of 180 degrees.

In use, the drive circuit 34 of the antenna drives the switching means 32 with a first drive signal of one pair of drive signals and a radiated beam pattern is emitted from the antenna as radiation from the source is evanescently coupled out of each active element of the antenna, e.g. each activated region of the rod 31. This radiated signal is maintained for a given period of time as determined by the choice of modulation scheme that is being used. The beam pattern is then maintained so that any echo signal reflected from a target is coupled to the rod 31 through the active elements evanescently, and the coupled signal that flows out of the rod is detected at the receiver which is coupled to the rod. Again, the timing of setting the beam patterns during transmission and reception of signals will depend entirely on the modulation scheme used and is not to be considered to be limiting to this invention.

The processor 37 then selects the second drive signal of the pair and the steps set out in the preceding paragraph are repeated for this second drive signal. This second drive signal corresponds to the same beam pattern but offset from the first beam pattern.

The apparatus also includes a comparison means which determines the phase difference between the two echo signals. In the embodiment of FIG. 3 this comprises a mixer 38 in which the transmit microwave signal used to produce the first echo is mixed with the first echo signal to get a first down converted signal. This is passed to an A/D converter 39 and stored in a memory as a string of digitised values representing the phase difference. The mixer 38 also combines the transmitted microwave signal that corresponds to the second echo to produce a second down converted signal that is also passed through an A/D converter and stored as a string of digitised values representing the phase difference. For any given location of target the difference between the first and second phase difference signals will be unique due to the slightly different paths of echo signals resulting from the shifted origins of the two beam patterns used. Alternatively, a second mixer may be provided with a 90 degree phase shift to form an in-phase and quadrature (IQ) mixer. Rather than just providing a single value at the A/D converter, an IQ mixer effectively provides two values comprising the real and imaginary terms for performing complex fast Fourier transforms (FFT).

To detect this difference in phase difference, and determine the angular location of the target, the processor 37 combines the digitised phase difference signals with the known offset of the origin to determine the direction to the target. In practice, the apparatus may switch repeatedly between one of the pair of drive signals and the other, collecting a set of digitised samples for each beam pattern which are stored in the memory. For example 1024 samples for each beam pattern may be collected. The processor may then apply an FFT to the samples. Each target detected will appear as a frequency in the Fourier series for each set of samples, and the relative phases of each of the frequencies can be identified by the processor from the Fourier series. In the case of a modulation scheme such as FSK, in which the transmitted microwave signals are modulated with a number of different frequencies, a different Fourier series will be present for each modulation frequency.

While the use of the antenna to emit one pair of beam patterns has so far been described, in practice each of the pairs of beam patterns will be applied and analysed in turn. In this way, a sweep over the complete range of angles covered by the apparatus is achieved. A series of pencil beams as shown in FIG. 5 are thereby pointed in each angular direction, one after the other, each beam actually comprising alternating beams of the same shape but with differing origins. In this embodiment the radar cycle will be the time required to sweep through the ten pairs of drive signals (and hence 11 pairs of identical but offset far field patterns).

Of course, it will be appreciated that the order in which the far field patterns are applied is not critical so long as the echoes from the correct paired fields are compared. For instance, a first drive signal of one pair may be applied and an echo detected. This may be repeated for a first signal of a second pair, then the second signal of the first pair and then the second signal of the second pair. The first and second signals of the first pair may then be compared to work out the phase difference, and then the first and second signals of the second pair. The skilled reader will appreciate that many other sequences can be used within the scope of the invention. However, it is preferred that the first and second beam patterns of each pair are used in sequence because the accuracy of the apparatus in determining angular position of targets degrades with increasing time delay between obtaining measurements for the first and second beams of a pair due to possible movement of the target in the intervening period.

Figure 6:
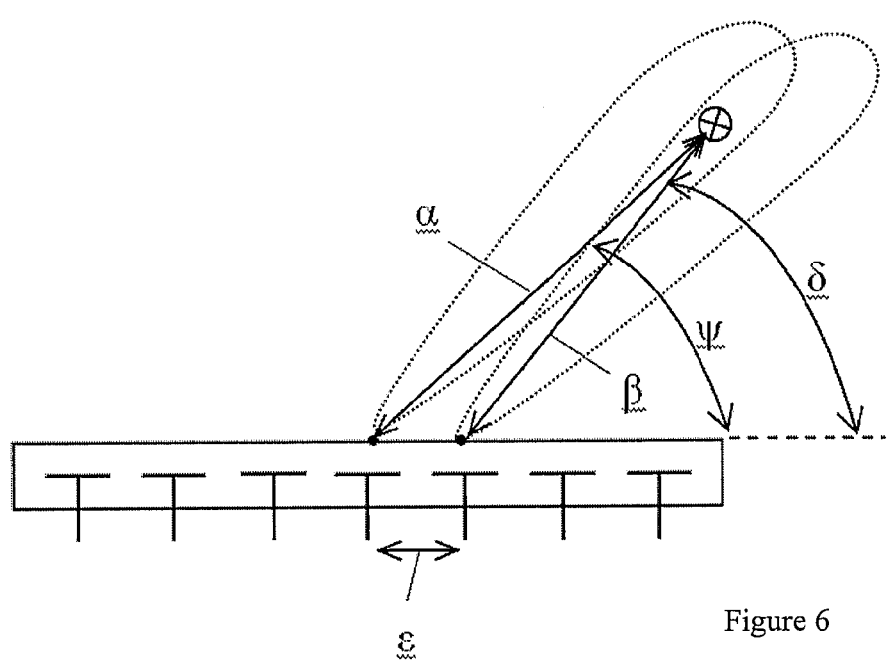
FIG. 6 is a representation of the process used to derive an accurate measurement of the angular position of the target.

In a refinement, it is possible to use three or more offset far field patterns for each pencil beam rather than a pair. For instance, where three are provided the origin of a second far field pattern may be offset from a first far field pattern by one element and a third far field pattern may be offset by two elements from the origin of the first pattern as shown. The echoes received for all three, or four or more, offset patterns may then be combined using the principles of triangulation or similar to determine a refined angular position measurement for a target. Because the length of the base of the triangle (the distance between the origins) is known, and the lengths of the two sides are known (from the echo phases) the angles of the two sides can be calculated and hence the position of the target at the tip of the triangle. This principle is a well known geometric principle and so will not be described further herein. Working from the assumption that all targets will be located in the far field, then the alpha α and beta β lines of FIG. 6 can be treated as being parallel as the object is so far away compared with the spacing between the origins. The difference in the distance between the two shifts then becomes r sin (θ) where r is the distance to the target and θ is the angle of both lines which is equal to the main direction of sensitivity of the beam pattern used which is predetermined.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An active antenna array of the kind comprising a plurality of switchable antenna elements controlled by a set of switches which is operable to selectively activate selected ones of the antenna elements to emit/receive a shaped beam of radiation, and wherein:
   the active antenna array is arranged to provide a first drive signal which causes the said set of switches to activate a first subset of said antenna elements at a first period of time, said first subset of antenna elements causing said antenna array to form a first beam having a first beam pattern, and to provide a second drive signal which causes said set of switches to activate a second subset of said antenna elements at a second period of time which is different from said first period of time, said second subset of antenna elements causing said antenna array to form a second beam having a second beam pattern, said first beam pattern and said second beam pattern comprising substantially identical far field radiation patterns but with different origins which are offset along an axis defined relative to said antenna array by a predetermined amount, and further comprising:
   a receiver which receives radiation that has been emitted by said antenna array and subsequently reflected from a target back to said antenna array when said antenna array is configured with the said first beam pattern and receives radiation that has been emitted by said antenna array and subsequently reflected from said target back to said antenna array when said antenna array has been configured with said second beam pattern,
   and further comprising a comparator which in use compares the said phase of the radiation received at said receiver when said antenna array is configured with said first beam pattern with the phase of said radiation received at said receiver when said antenna array is configured with said second beam pattern to provide a phase difference signal, and a target locator which determines the angular location of said target relative to said antenna array by processing said phase difference signal with said offset between said different origins of said first far field radiation pattern and said second far field radiation pattern.

2. An active antenna array according to claim 1 in which said first beam patterns and said second beam pattern each include a main beam end are identical apart from said main beams having different origins along said array of elements.

3. An active antenna array according to claim 1 which is adapted to measure the velocity of said target from the frequency and phase of said beams.

4. An active antenna array according to claim 1 wherein said switchable antenna elements comprise a linear array of length X elements, which are equally spaced, and in which said first drive signal causes a first subset of said X antenna elements forming said antenna array to be switched either on or off in a set pattern which spans a length of Y elements, where Y is less than X; and said second drive signal causes a second, different, subset of said X antenna elements which spans a length of Y elements to be switched either on or off in the same pattern but offset from said first pattern.

5. An active antenna array according to claim 4 wherein said first drive signal and said second drive signal correspond to a directional far field pattern having a major lobe whose origin is located at a centre of said length of Y antenna elements, and whose dominant direction is dependent on said pattern of said elements within said length of Y antenna elements which are active.

6. An active antenna array according to claim 1 which is arranged to provide multiple pairs of first drive signals and second drive signals, each pair of drive signals causing said antenna array to be configured in first and second beam shapes, with the shapes of each pair corresponding to substantially identical, but offset, far field radiation patterns, and the shapes of the beam patterns of each pair being different to provide different directional sensitivities.

7. An active antenna array according to claim 6 which is arranged to drive said antenna elements sequentially with each pair of first and second drive signals of said multiple pairs to sweep a set of major lobes across a range of angles as determined by the far field radiation patterns.

8. An active antenna array according to claim 1 which comprises two feeders, one for coupling radiation from a source to the active elements and another for coupling radiation received at the active elements to a detector.

9. An active antenna array according to claim 1 wherein a single feeder is used to both transmit and receive radiation.

10. A method of controlling an active antenna array so as to determine the angular location of a target, said active antenna array comprising a plurality of switchable antenna elements controlled by a set of switches which is operable to selectively active selected ones of said antenna elements to emit or receive radiation from or to a source of radiation, said method comprising the steps of:
   (i) providing a first drive signal which causes said set of switches to activate a first subset of antenna elements at a first period of time, said first subset of antenna elements causing said antenna array to form a beam having a first beam pattern,
   (ii) providing a second drive signal which causes said set of switches to activate a second subset of antenna elements at a second period of time, said second subset of antenna elements causing said antenna array to form a beam having a second beam pattern, said first beam pattern and said second beam pattern providing substantially identical far field radiation patterns but with different origins which are offset along an axis defined relative to said antenna array by a predetermined amount, and further comprising:
   (iii) receiving radiation that has been emitted by said antenna array and subsequently reflected from said target back to said antenna array when said antenna array is configured with said first beam pattern,
   (iv) receiving radiation that has been emitted by said antenna array and subsequently reflected from said target back to said antenna array when said antenna array has been configured with said second beam pattern, (v) comparing the phase of the said received radiation corresponding to said antenna array being configured with said first beam pattern with the phase of said received radiation corresponding to said antenna array being configured with said second beam pattern to provide a phase difference signal, and (vi) determining the angular location of said target relative to said antenna array by processing said phase difference signal with said offset between said different origins of said far field radiation patterns of said first beam pattern and said second beam pattern.

11. The method of claim 10 which further comprises providing a first drive signal and a second drive signal which respectively cause a first subset of said antenna elements and a second different, subset of said antenna elements to be switched with the same pattern of elements being on and off, said first subset of switched antenna elements being offset said antenna array from said second subset of switched antenna elements.

12. The method of claim 10 wherein said the first subsets of antenna elements and said second subset of antenna elements have a length, in elements, less than the total length of said array of antenna elements.

13. The method of claim 10 which comprises repeating steps (i) to (vi) using different pairs of first and second drive signals, each pair of first and second drive signals causing said antenna to be configured with the same far field pattern within each pair, but differing far field patterns for each of said different pairs.

14. The method of claim 13 wherein said far field patterns each provide a different directional sensitivity to said antenna array to enable a sweep across multiple directions to be made.

15. The method of claim 10 wherein each far field pattern defines a main beam with a maximum width of substantially +/−15 degrees.

* * * * *